United States Patent [19]

Hart

[11] 4,161,340
[45] Jul. 17, 1979

[54] POPPET VALVE TYPE BRAKE CONTROL VALVE DEVICE

[75] Inventor: James E. Hart, Trafford, Pa.

[73] Assignee: Westinghouse Air Brake Company, Wilmerding, Pa.

[21] Appl. No.: 908,484

[22] Filed: May 22, 1978

[51] Int. Cl.² ............................................. B60T 15/22
[52] U.S. Cl. ....................................... 303/33; 303/75
[58] Field of Search ....................... 303/33, 36, 37, 63, 303/64, 75, 84R

[56] References Cited

U.S. PATENT DOCUMENTS

| 2,034,287 | 3/1936 | Farmer | 303/75 X |
| 4,043,604 | 8/1977 | Hart | 303/33 |

Primary Examiner—Duane A. Reger
Attorney, Agent, or Firm—R. W. McIntire, Jr.

[57] ABSTRACT

A brake control valve device for a railway vehicle having a service valve piston assembly subject to a pressure differential between the brake pipe and a single reservoir acting on a first piston and to brake cylinder delivery pressure acting on a second piston of the assembly. A brake pipe reduction actuates the service valve assembly, toward service application position, in which position, the single reservoir pressure is connected to a pilot chamber of a brake cylinder exhaust control valve for actuating a brake cylinder exhaust valve to its closed position, while concurrently, connecting the single reservoir pressure to the car brake cylinders. Pressure limiting means is provided to assure that sufficient pressure remains in the single reservoir following a full service or overreduction application for the purpose of providing additional braking pressure during an emergency brake application.

In the event the brake pipe reduction is only due to a pressure transient of short term duration, the service valve assembly is capable of dissipating sufficient reservoir pressure to counteract such brake pipe transient and accordingly prevent its movement to service application position.

12 Claims, 1 Drawing Figure

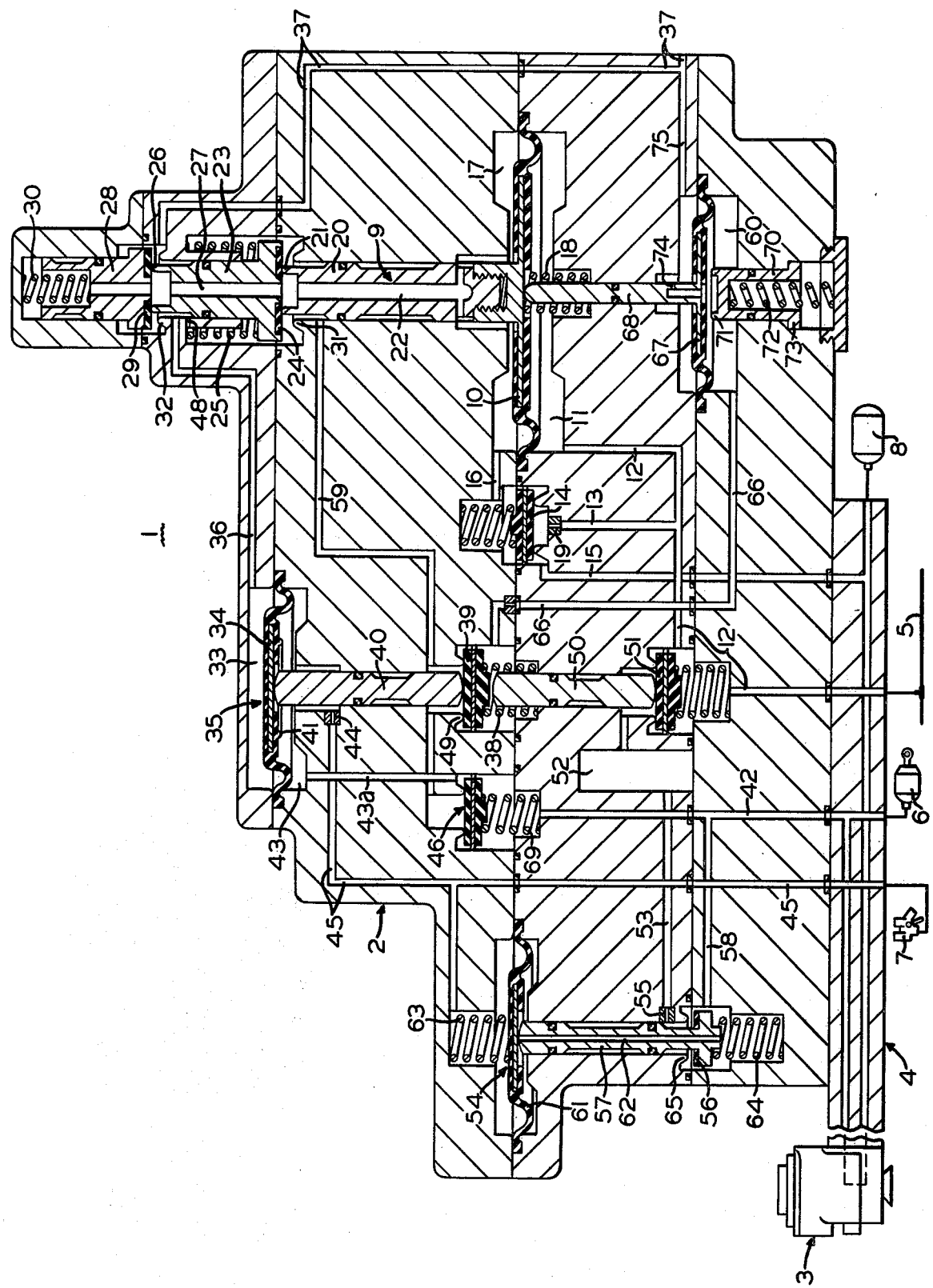

POPPET VALVE TYPE BRAKE CONTROL VALVE DEVICE

BACKGROUND OF THE INVENTION

The present invention is related to brake control valve devices which are particularly applicable to freight service.

Standard freight brake control valve devices in service today employ essentially slide valve type valve construction, which not only requires a high degree of skill to manufacture, but also requires great skill to service and maintain in accordance with A.A.R. requirements. Such present day freight brake control valve devices thus represent a high cost item in a railroad car brake system. In attempting to alleviate this problem of high cost, poppet type valve construction has been suggested as an alternative to the typical slide valve construction.

SUMMARY OF THE INVENTION

One object of the present invention, therefore, is to provide a freight brake control valve device employing poppet type valve construction that is more economical to manufacture and service than conventional control valve devices.

Another object of this invention is to provide a poppet valve type brake control valve device that makes possible the elimination of the typical emergency reservoir so that only a single reservoir is required to provide both service and emergency brake applications.

Still another object of the invention is to provide a freight brake control valve device capable of maintaining brake cylinder pressure against leakage.

Another object of the invention is to provide a control valve device that is stable in release position against transient brake pipe pressure reductions to prevent undesired brake applications.

A final object is that of providing a control valve device that assures fast and positive application of brakes on cars located near the end of a train, particularly when a relatively light brake application is made.

In meeting these objections, there is provided a freight brake control valve service portion in which a service piston valve assembly comprises a double valve member and a differential piston abutment that is subject to brake pipe pressure on one side and auxiliary reservoir pressure charged from the brake pipe pressure on the opposite side. When brake pipe pressure drops for any reason, the higher auxiliary reservoir pressure forces the service valve assembly toward brake application position. Before reaching application position, however, a first valve of the double valve member is operated in a preliminary application position to connect auxiliary reservoir pressure to the control chamber of a brake cylinder exhaust control piston valve and to atmosphere via a dissipation choke. In dissipating auxiliary reservoir pressure in this manner, movement of the control piston valve assembly to application position is counteracted when the brake pipe reduction arises from a short term pressure transient. In the event, the brake pipe reduction arises from a bona-fide brake application being made, the rate of auxiliary reservoir pressure dissipation is insufficient to stabilize movement of the service valve assembly, which accordingly is forced to application position in which a second valve of the double valve member is operated to connect auxiliary reservoir pressure to the brake cylinders and to concurrently terminate the dissipation of auxiliary reservoir pressure, which accordingly builds up sufficiently to pilot the brake cylinder exhaust control piston valve to its closed position.

A feedback piston of the service valve assembly is subject to the brake cylinder pressure for urging the control piston valve assembly in the brake release direction so that when the desired brake cylinder pressure for a given brake pipe reduction is obtained, the service valve assembly will be force balanced in a position in which the second valve of the double valve member cuts off further supply of auxiliary reservoir pressure to the brake cylinders, while the first valve member continues to provide a path via which the auxiliary reservoir pressure maintains the brake cylinder exhaust control piston valve in its closed position.

During brake release, brake pipe pressure is increased to upset the force balance at the service valve assembly to force the assembly to brake release position in which the first valve member is operated to vent the auxiliary reservoir pilot pressure from the control chamber of the brake cylinder exhaust control piston valve. This permits the brake cylinder pressure effective under the piston to unseat the exhaust valve and flow to atmosphere to release the brakes directly.

Other objects and advantages of the invention will become apparent from the following more detailed description and operation when taken with the single FIGURE drawing showing a diagrammatic view of a novel freight brake control valve device.

DESCRIPTION AND OPERATION

The brake control valve device 1 consists of a service portion 2 to which the invention is directed, an emergency portion 3 of conventional design, such as that used with the well known AB/D type brake control valve device and a pipe bracket 4 to which the service and emergency portions are connected in a conventional and well known manner. Connected to the pipe bracket 4 by appropriate piping is a brake pipe 5, a conventional brake cylinder device 6, a conventional retainer valve device 7, and an auxiliary reservoir 8.

The service portion comprises a service valve assembly 9 including a differential diaphragm type piston abutment 10, which cooperates with the casing to form a chamber 11 to which the pressure in brake pipe 5 is connected via a passage 12. A branch passage 13 connects brake pipe pressure from passage 12 past a charging check valve device 14 to a passage 15 leading to the auxiliary reservoir 8 and to a passage 16 leading to a chamber 17 formed on the opposite side of differential piston abutment 10. A spring 18 biases piston abutment 10 in the direction the brake pipe pressure is acting.

During initial charging, the charging check valve device 14, which is spring loaded, cooperates with a choke 19 in branch passage 13 to retard the buildup of auxiliary reservoir pressure in chamber 17 relative to brake pipe pressure effective in chamber 11. The resultant force imbalance on piston abutment 10 due to this pressure differential and the effect of bias spring 18 drives the service valve assembly 9 to brake release position, as shown.

A stem 20 of piston abutment 10 terminates in an annular valve seat 21 and is provided with a central passageway 22 interconnecting the area within valve seat 21 with chamber 17. A valve member 23 arranged coaxially with stem 20 is provided at one end with a valve element 24 that is urged into engagement with valve seat 21 by a bias spring 25 acting on member 23. The other end of member 23 is provided with an annular valve seat 26. Valve member 23 contains a central through passageway 27 terminating at one end within the area of valve seat 21 and at the other end within the area of valve seat 26. Another valve member 28 is provided with a seal element 29 with which seat 26 is engaged against the resistance of a bias spring 30. A pair of annular valve seats 31 and 32 are formed on the casing in surrounding relationship with valve seats 21 and 26, respectfully. These seats 31, 32 are aligned for engagement with the respective valve elements 24 and 29, which are disengaged therefrom in release position, as shown.

With the service valve assembly 9 in release position, as explained, a chamber 33 formed on one side of a diaphragm type control piston valve 34 comprising a brake cylinder exhaust control valve device 35 is connected to atmosphere via a passage 36, the open valve 29/32 and a passage 37. In the absence of pressure in chamber 33, a spring 38 acting through a feedback check valve 39 and a stem 40 of diaphragm piston valve 34 forces the piston valve 34 to its release position in which the diaphragm valve 41 thereof is disengaged from its seat on the casing. Brake cylinder device 6 is thus connected to atmosphere via a brake cylinder delivery passage 42, a passage 43a, a chamber 43 of the brake cylinder exhaust control valve device 35, a choke 44, exhaust passage 45 and the retainer valve device 7. A brake cylinder pressure limiting check valve device 46 is disposed in delivery passage 42 for a purpose hereinafter explained.

Assuming now with the various components of the control valve device 1 in their brake release position, as explained, a brake pipe pressure reduction, in the form of a short duration pressure transient, is registered: This momentary reduction will be effective in chamber 11, while auxiliary reservoir pressure in chamber 17 will be trapped by closure of charging check valve 14 and thereby establish a preponderance of pressure urging piston abutment 10 in a downward direction from full release position toward brake application position. In response to the initial movement, valve element 29 of member 28 is pressed into engagement with seat 32, by spring 30, while spring 25 forces member 23 to follow stem 20 of piston abutment 10 to subsequently disengage its seat 26 from valve element 29. Closure of valve 29/32 in this preliminary application position cuts off the venting of control chamber 33 of the brake cylinder exhaust control valve device 35, while concurrent opening of valve 26/29 establishes fluid pressure communication between chamber 17 via central passage 22 in stem 20, central passage 27 in member 23, valve 26/29, a dissipation choke 48, valve 24/31, supply passage 59, check valve 46, passage 43a, chamber 43 of brake cylinder exhaust control valve device 35, open exhaust valve 41, choke 44 and exhaust passage 45. Accordingly, reservoir pressure in chamber 17 opposing the brake pipe pressure in chamber 11 is dissipated at a rate dictated by dissipation choke 48, such dissipation rate being sufficient to reestablish a force balance across piston abutment 10 before its movement from preliminary application to brake application position can occur. In this manner, an undesired brake application in response to the assumed short duration pressure transient is prevented and the service valve assembly 9 is moved back to release position upon disappearance of the pressure transient and the restoration of normal brake pipe pressure. In dissipating auxiliary reservoir pressure to atmosphere, there is no back flow of pressure to brake pipe 5 as in conventional freight brake control valve devices and consequently a certain advantage of the present invention is that of assuring more positive application of rear-end train brakes, particularly when only a relatively light brake application is made.

In the event a brake pipe pressure reduction has occurred as a result of the engineer initiating a service brake application, for example, the rate of dissipation of auxiliary reservoir pressure from chamber 17 via the dissipation choke 48 in response to initial movement of piston abutment 10 toward brake application position will be insufficient to counterbalance the brake pipe reduction occurring in chamber 11. Accordingly, piston abutment 10 will be forced from preliminary application position toward brake application position, resulting first in closure of valve 24/31 to positively cut off further dissipation of auxiliary reservoir pressure, which is thus able to build up in control chamber 33 and thereby actuate the brake cylinder exhaust control valve device 35.

Actuation of brake cylinder exhaust control valve device 35 effects seating of diaphragm valve 41 to cut off brake cylinder delivery passage 42 from atmosphere via passage 45 and retainer valve 7. In this brake cylinder exhaust cut-off position, stem 40 is deflected to disengage feedback check valve 39 from its seat 49, which in turn deflects a stem 50 that opens a quick service check valve device 51 in passage 12. With the quick service check valve open, the pressure in brake pipe 5 is connected to a quick service volume 52 and thence via a passage 53 to a quick service limiting valve device 54. Brake pipe pressure in passage 53 is connected via a choke 55 and a valve element 56 carried on a stem 57 to a passage 58 and delivery passage 42 leading to the brake cylinders 6. A local reduction of brake pipe pressure at control valve device 1 is thus realized to propagate the train line brake pipe reduction.

With the auxiliary reservoir dissipation now terminated and quick service activity occurring, positive movement of piston abutment 10 to brake application position is realized, such movement resulting in the disengagement of valve seat 21 of stem 20 from valve element 24. Consequently, auxiliary reservoir pressure is connected to the brake cylinders 6 via passage 15, passage 16, chamber 17, central passage 22 in stem 20, open valve 24/21, supply passage 59, pressure limiting check valve 46 and delivery passage 42. As brake cylinder pressure builds up, it becomes effective under diaphragm piston 61 of the quick service limiting valve device 54 via a central passage 62 in stem 57. At a preselected value of brake cylinder pressure, the load of a spring 63 acting on diaphragm piston 61 in opposition to brake cylinder pressure is overcome and piston 61 is deflected upwardly. A spring 64 acting on stem 57 urges the stem to follow this deflection of piston 61 until valve element 56 engages its seat 65 to cut off further quick service flow of brake pipe pressure to the brake cylinders 6, notwithstanding the fact that quick service check valve 51 remains open until a brake release is instigated.

As brake cylinder pressure continues to build up, a branch passage 66 of brake cylinder supply passage 59 at the downstream side of valve element 39 connects brake cylinder supply pressure to a chamber 60 formed by a feedback piston valve device 67. The force of this pressure acting on piston valve device 67 is transmitted by a stem 68 to the brake pipe pressure side of piston abutment 10 to reverse the force differential on piston abutment 10. At the very point of this force differential reversal, piston abutment 10 is urged back toward release position until valve seat 21 is reengaged with valve element 24, thereby terminating further flow of reservoir pressure to brake cylinders 6 via supply passage 59. With the termination of any further reduction of reservoir pressure, service valve assembly 9 is stabilized in a pressure holding position in which valve seats 21 and 32 are each engaged with valve element 24.

If a loss of brake cylinder pressure subsequently occurs, as by leakage, the pressure effective in chamber 60 will be correspondingly reduced and a force imbalance created on the service valve assembly 9 in a direction urging movement of the assembly to application position, in which valve element 24 becomes disengaged from seat 31 to effect a further supply of pressure from reservoir 8 to brake cylinders 6, thereby compensating the brake cylinder pressure leakage.

It should be noted, at this point, that the volume of reservoir 8 is selected to produce the desired emergency brake cylinder pressure by complete equalization with brake cylinders 6. It stands to reason, therefore, that lesser service brake pressures can only be realized by prematurely terminating this equalization between reservoir 8 and brake cylinders 6, as accomplished in accordance with the foregoing explanation discussing stabilization of service valve assembly 9 in its holding position. By properly selecting the relative sizes of pistons 10 and 67, any desired service brake cylinder pressure can be obtained for a given level of brake pipe reduction.

In that the volume of auxiliary reservoir 8 is by necessity (for compatibility with conventional AB/D type freight brake equipment) sufficient to produce brake cylinder pressure during an emergency application approximately 10–12 psi. greater than during a full service application, a bias spring 69 associated with the brake cylinder limiting check valve 46 assures that the pressure effective at the brake cylinders 6 is always approximately 10–12 psi. less than the delivery pressure in passage 59, thus assuring that an over-reduction of brake pipe pressure does not produce brake cylinder pressure exceeding pressure attained at full service.

When it is desired to release the brakes, the pressure in brake pipe 5 is increased, producing an upward acting force differential across piston abutment 10. As a result of this force differential, piston abutment 10, stem 22, valve member 23 and valve member 28 all move upward in tandem to effect unseating of valve 29/32. Control pressure in chamber 33 of the brake cylinder exhaust control valve device 35 is accordingly vented to atmosphere via passage 36, open valve 29/32, and passage 37. Brake cylinder pressure present in chamber 43 acting under the outer periphery of diaphragm valve 34 is thus effective to unseat the diaphragm valve and expose its entire under surface to the brake cylinder pressure and thereby establish positive actuation thereof. Brake cylinder pressure is now vented to atmosphere via passage 42, chamber 43, choke 44, passage 45 and the exhaust retainer valve 7.

In the open position of the brake cylinder exhaust control valve device 35, feedback check valve 39 is immediately forced into engagement with its seat 49 by spring 38 to prevent the backflow of pressure from chamber 60 to atmosphere. The pressure in chamber 60 is thus momentarily trapped and acts on feedback piston valve 67 to give added impetus to the upward movement of piston abutment 10 to assure positive movement of the service valve assembly 9 to full release position. In this manner, a reapplication of the service valve assembly 9 is prevented from occuring, it being understood that such reapplication could otherwise occur by reason of the fact that a release of the pressure abutment 10 by a greater amount than the slowly increasing brake pipe pressure could add.

A spring loaded valve member 70 having an annular seat 71 that is normally held in engagement with piston valve 67 by a spring 72 is restricted from following movement of piston valve 67 through its full upward travel by reason of a shoulder 73 that is arranged to contact a stop formed by the casing. Valve 67/71 is thus opened and pressure in chamber 60 is connected to atmosphere at a controlled rate via a choke 74 in piston valve 67, a passage 75 and atmospheric passage 37. This reduction of pressure in chamber 60 causes another force reversal on service valve assembly 9, which is accordingly moved downward until piston valve 67 reengages seat 71 to cut off venting of chamber 60. It is important to note at this point that piston valve 67 picks up seat 71 before either valve 26/29 or 21/24 opens. As brake pipe pressure continues to build up, a sufficient force differential (with brake pipe pressure being predominant) again develops to move the service valve assembly back to full release position, in which piston valve 67 is again disengaged from seat 71 to further vent chamber 60. This periodic venting of control chamber pressure continues for the duration brake pipe pressure is recharged to establish a controlled release of pressure from chamber 60 to assure against an undesirable reapplication of the brakes during a brake release. The fact that the service valve assembly shuttles within a range of movement defining full release position without reaching preliminary application position during this cyclic venting of chamber 60 assures that the degree of downward deflection of assembly 9 is insufficient to either resupply pressure to chamber 33 or to brake cylinder supply passage 59.

An emergency brake application may be made in a conventional manner in which appropriate components of the conventional emergency portion 3 sense an emergency rate of brake pipe pressure reduction to establish a fluid pressure communication between a branch passage 75 of passage 15 and a passage 76 leading to the brake cylinder delivery passage 42. Thus, the reservoir pressure is able to flow to brake cylinders 6 via the emergency portion 3 in bypass of the service portion 2 whenever the pressure in reservoir 8 drops below a value sufficient to open limiting check valve 46 against its bias spring 69, thereby providing for complete equalization of the reservoir pressure with the brake cylinders 6 to obtain emergency brake pressure approximately 10–12 psi. greater, for example, than full service brake pressure, such being obtained using only a single reservoir 6.

Having now described the invention, what I claim as new and desire to secure by Letters Patent, is:

1. For use in a railway car brake system having a brake pipe, a reservoir normally charged to the pressure carried in the brake pipe and a brake cylinder device, there is provided a brake control valve device comprising:

(a) a brake cylinder delivery passage to which said brake cylinder device is connected;

(b) a first exhaust passage via which said brake cylinder delivery passage is connected to atmosphere;

(c) a supply passage via which said brake cylinder delivery passage is connected to said reservoir;

(d) an exhaust control piston valve device in said first exhaust passage operative in a first position thereof to establish fluid pressure communication between said brake cylinder delivery passage and atmosphere and having a control chamber associated therewith, pressurization of said control chamber effecting operation of said piston valve device to a second position in which said communication is interrupted; and (e) a service valve assembly operatively disposed in said supply passage comprising:

(i) a movable piston abutment subject opposingly to the pressure carried in said brake pipe and in said reservoir; and (ii) valve means including first, second and third valve elements, said first valve element being operative upon movement of said piston abutment from a full release position to a preliminary application position in response to a reduction of said brake pipe fluid pressure relative to said reservoir fluid pressure to establish fluid pressure communication between said reservoir and said control chamber, said second valve element effecting dissipation of the reservoir pressure connected to said control chamber via said delivery passage in response to movement of said piston abutment to said preliminary application position, thereby to prevent a buildup of fluid pressure in said control chamber sufficient to effect movement of said piston valve device from said first position to said second position thereof and to counterbalance a brake pipe reduction of short term duration to prevent movement of said piston abutment from said preliminary application position to a service application position thereof, said third valve element being operative only in response to movement of said piston abutment from said preliminary application position to said service application position thereof when said brake pipe reduction continues for a period exceeding said short term duration incident to a service brake application being made to establish fluid pressure communication between said reservoir and said supply passage.

2. A brake control valve device as recited in claim 1, further comprising a fluid pressure flow restrictor via which the reservoir fluid pressure connected to said control chamber via said first valve element is connected to said second valve element.

3. A brake control valve device as recited in claim 1, wherein said service valve assembly further comprises feedback piston means engageable with said piston abutment and subject to the fluid pressure in said supply passage for urging movement of said piston abutment in the direction of said full release position to cause said third valve means to terminate the fluid pressure communication between said reservoir and said supply passage.

4. A brake control valve device as recited in claim 3, wherein said feedback piston means comprises:

(a) a piston valve having a feedback chamber formed on one side thereof and a second exhaust passage connecting said feedback chamber to atmosphere; and (b) an annular valve seat in said feedback chamber in surrounding relationship with the orifice of said second exhaust passage, said valve seat being disposed in a predetermined position relative to said piston valve so as to be disengaged therefrom in said full release position and engageable therewith responsive to movement of said piston abutment toward but prior to reaching said preliminary application position; and wherein said control valve device further comprises first check valve means in said supply passage operative responsive to movement of said exhaust control valve device to said second position thereof for admitting fluid pressure from said supply passage to said feedback chamber and operative responsive to movement of said exhaust control valve device to said first position thereof to terminate the admission of fluid pressure to said feedback chamber.

5. A brake control valve device as recited in claim 4, further characterized in that said valve seat is movable, being spring biased to said predetermined position to permit deflection of said piston abutment toward said service application position.

6. A brake control valve device as recited in claim 1 or 4 wherein, (a) said valve means includes a fourth valve element via which fluid pressure communication is established between said control chamber and atmosphere in said full release position of said service valve assembly; and (b) said exhaust control piston valve device is subject to the fluid pressure in said brake cylinder delivery passage acting in opposition to the fluid pressure effective in said control chamber to urge said exhaust control piston valve device to said first position thereof.

7. A brake control valve device as recited in claim 6, further comprising second check valve means arranged between said supply passage and said brake cylinder delivery passage to permit one-way flow from said supply passage to said brake having a bias spring acting in the direction opposing said one-way flow of fluid pressure, so that the fluid pressure effective in said feedback chamber is greater than said brake cylinder pressure.

8. A brake control valve device as recited in claim 1 or 3, further comprising quick service check valve means operable responsive to movement of said exhaust control piston valve device to said second position thereof for connecting the fluid pressure in said brake pipe to a volume.

9. A brake control valve device as recited in claim 8, further comprising a quick service limiting valve device subject to bias means urging the limiting valve thereof to a normal position communicating said quick service volume with said brake cylinder delivery passage, said quick service limiting valve device being further subject opposingly to the fluid pressure in said brake cylinder delivery passage to effect closure of said limiting valve and thereby terminate said quick service communication when the brake cylinder fluid pressure exceeds a value corresponding to said bias means.

10. For use in a railway car brake system having a brake pipe, a reservoir normally charged to the pressure carried in the brake pipe and a brake cylinder device, there is provided a brake control valve device comprising:

(a) a brake cylinder delivery passage to which said brake cylinder device is connected;
(b) a first exhaust passage via which said brake cylinder delivery passage is connected to atmosphere;
(c) a supply passage via which said brake cylinder delivery passage is connected to said reservoir;
(d) an exhaust control piston valve device in said first exhaust passage operative in a first position thereof to establish fluid pressure communication between said brake cylinder delivery passage and atmosphere and having a control chamber associated therewith, pressurization of said control chamber effecting operation of said piston valve device to a second position in which said communication is interrupted; and
(e) a service valve assembly operatively disposed in said supply passage comprising:
   (i) a movable piston abutment subject opposingly to the pressure carried in said brake pipe and in said reservoir; and
   (ii) valve means engageable with said piston abutment for movement therewith to a brake release position in response to a predominance of brake pipe fluid pressure relative to said reservoir fluid pressure and movable from said brake release position to a brake application position in response to a reduction of said brake pipe fluid pressure relative to said reservoir fluid pressure for establishing fluid pressure communication between said reservoir and said brake cylinder device and between said reservoir and said control chamber.

11. A brake control valve device as recited in claim 10 wherein said valve means comprises first and second valve elements operative independently of each other during movement of said piston abutment from said brake release position to said brake application position, said first valve element being operative in said brake application position to establish fluid pressure communication between said reservoir and said control chamber, said second valve element being operative following operation of said first valve element to establish fluid pressure communication between said reservoir and said brake cylinder device.

12. A brake control valve device as recited in claim 11 wherein,
(a) said service valve assembly further comprises bias means for urging said piston abutment toward said release position; and
(b) said valve means further comprising a third valve element via which the fluid pressure in said control chamber is vented to atmosphere in said brake release position of said piston abutment.

* * * * *